United States Patent
Shim et al.

(10) Patent No.: US 10,020,502 B2
(45) Date of Patent: Jul. 10, 2018

(54) POSITIVE ACTIVE MATERIAL FOR RECHARGEABLE LITHIUM BATTERY, METHOD OF PREPARING SAME, AND RECHARGEABLE LITHIUM BATTERY INCLUDING SAME

(71) Applicant: SAMSUNG SDI CO., LTD., Yongin-si, Gyeonggi-do (KR)

(72) Inventors: Jae-Hyun Shim, Yongin-si (KR); Ki-Soo Lee, Yongin-si (KR); Ho Kim, Yongin-si (KR); Jae-Han Lee, Yongin-si (KR); Se-Hee Lee, Yongin-si (KR); Hyeon-Ah Ju, Yongin-si (KR); Joo-Han Song, Yongin-si (KR); Yoon-Hee Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 85 days.

(21) Appl. No.: 14/948,100

(22) Filed: Nov. 20, 2015

(65) Prior Publication Data
US 2016/0149215 A1    May 26, 2016

(30) Foreign Application Priority Data
Nov. 21, 2014    (KR) .......................... 10-2014-0163370

(51) Int. Cl.
 *H01M 4/485* (2010.01)
 *H01M 10/0525* (2010.01)
 (Continued)

(52) U.S. Cl.
CPC .......... *H01M 4/485* (2013.01); *C01G 23/005* (2013.01); *C01G 51/42* (2013.01);
(Continued)

(58) Field of Classification Search
CPC .......................... H01M 4/485; H01M 10/0525
See application file for complete search history.

(56) References Cited

U.S. PATENT DOCUMENTS

| 2012/0156565 A1* | 6/2012 | Kim | ................... | H01M 4/0471 429/221 |
| 2014/0057173 A1* | 2/2014 | Jeong | ................... | H01M 4/366 429/219 |

(Continued)

FOREIGN PATENT DOCUMENTS

| KR | 10-2006-0085085 A | 7/2006 |
| KR | 10-2009-0091053 A | 8/2009 |

(Continued)

OTHER PUBLICATIONS

Fey, George Ting-Kuo et al., "Improved electrochemical performance of LiCoO₂ surface treated with Li₄Ti₅O₁₂", Journal of Power Sources, Jun. 26, 2007, pp. 1147-1151, vol. 174.

(Continued)

*Primary Examiner* — Stewart A Fraser
*Assistant Examiner* — Rachel L Zhang
(74) *Attorney, Agent, or Firm* — Lewis Roca Rothgerber Christie LLP

(57) ABSTRACT

A positive active material for a rechargeable lithium battery includes a lithium intercalation compound; and lithium titanium oxide represented by Chemical Formula 1 on the surface of the lithium intercalation compound surface.

$$Li_{4-x}M_xTi_yO_{12-z}.$$    Chemical Formula 1

In the Chemical Formula 1,
$0<x\le3$,
$1\le y\le5$,
$-0.3\le z\le0.3$, and (Continued)

M is an element selected from Mg, Al, Ga, La, Tb, Gd, Ce, Pr, Nd, Sm, Ba, Sr, Ca, and combinations thereof.

13 Claims, 20 Drawing Sheets

(51) Int. Cl.
  *C01G 23/00* (2006.01)
  *C01G 51/00* (2006.01)

(52) U.S. Cl.
  CPC ...... *C01P 2002/54* (2013.01); *C01P 2004/03* (2013.01); *C01P 2004/04* (2013.01); *C01P 2004/80* (2013.01); *C01P 2004/82* (2013.01); *C01P 2006/40* (2013.01); *H01M 10/0525* (2013.01)

(56) References Cited

U.S. PATENT DOCUMENTS

| | | | |
|---|---|---|---|
| 2014/0272572 A1* | 9/2014 | Chu | H01M 4/628 429/215 |
| 2015/0017550 A1* | 1/2015 | Nishimura | H01M 4/485 429/322 |

FOREIGN PATENT DOCUMENTS

| | | |
|---|---|---|
| KR | 10-2011-0134852 A | 12/2011 |
| KR | 10-2012-0094636 A | 8/2012 |
| KR | 10-2013-0136026 A | 12/2013 |

OTHER PUBLICATIONS

Yi, Ting-Feng et al., "Enhanced cycling stability of microsized $LiCoO_2$ cathode by $Li_4Ti_5O_{12}$ coating for lithium ion battery", Materials Research Bulletin, Nov. 24, 2009, pp. 456-459, vol. 45.

* cited by examiner

POSITIVE ACTIVE MATERIAL FOR RECHARGEABLE LITHIUM BATTERY, METHOD OF PREPARING SAME, AND RECHARGEABLE LITHIUM BATTERY INCLUDING SAME

CROSS-REFERENCE TO RELATED APPLICATION

This application claims priority to and the benefit of Korean Patent Application No. 10-2014-0163370 filed in the Korean Intellectual Property Office on Nov. 21, 2014, the entire content of which is incorporated herein by reference.

BACKGROUND

1. Field

One or more embodiments of the present disclosure relate to a positive active material for a rechargeable lithium battery, a method of preparing the same and a rechargeable lithium battery including the same.

2. Description of the Related Art

Lithium rechargeable batteries have recently drawn attention as a power source for small portable electronic devices. Lithium rechargeable batteries typically use (utilize) an organic electrolyte solution and thus, have two times or more higher discharge voltage than that of a battery in the related art using an alkali aqueous solution. Accordingly, lithium rechargeable batteries using an organic electrolyte solution have high energy density.

As a positive active material for a rechargeable lithium battery, a lithium-transition metal oxide having a structure capable of intercalating lithium ions (such as $LiCoO_2$, $LiMn_2O_4$, $LiNi_{1-x}Co_xO_2$ (0<x<1), and/or the like) may be utilized.

As a negative active material, various carbon-based materials (such as artificial graphite, natural graphite, and/or hard carbon), which intercalate and deintercalate lithium, and oxides (such as tin oxide, lithium vanadium-based oxide, and/or the like) have been used.

SUMMARY

One or more aspects of embodiments of the present invention are directed to a positive active material for a rechargeable lithium battery having excellent cycle-life characteristics.

One or more embodiments are directed to a method of preparing the positive active material.

One or more embodiments are directed to a rechargeable lithium battery including the positive active material.

According to one or more embodiments, a positive active material for a rechargeable lithium battery includes a lithium intercalation compound; and a lithium titanium oxide represented by Chemical Formula 1 on the surface of the lithium intercalation compound.

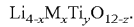 Chemical Formula 1

In Chemical Formula 1,
0<x≤3,
1≤y≤5,
−0.3≤z≤0.3, and
M is an element selected from Mg, Al, Ga, La, Tb, Gd, Ce, Pr, Nd, Sm, Ba, Sr, Ca, and combinations thereof.

The lithium titanium oxide may be $Li_{4-x}M_xTi_5O_{12}$. The lithium titanium oxide may have a spinel structure.

The lithium titanium oxide may be included in an amount of about 2.0 wt % to about 6.0 wt % based on 100 wt % of the positive active material.

The lithium intercalation compound may be an M-doped compound, where M is selected from Mg, Al, Ti, La, Tb, Gd, Ce, Pr, Nd, Sm, Ba, Sr, Ca, and combinations thereof. The M may be doped in an amount of about 0.1 mol % to about 2 mol % based on 100 mol % of the lithium intercalation compound.

According to one or more embodiments, a method of preparing a positive active material for a rechargeable lithium battery includes mixing titanium compound-containing liquid and a lithium intercalation compound to prepare a mixture; drying the mixture to obtain a dried product; and heat-treating the dried product.

The titanium compound-containing liquid may have a concentration of about 1.5 wt % to about 3.0 wt % of a titanium compound based on the total amount of the liquid.

A mixing ratio of the titanium compound-containing liquid and lithium intercalation compound may be a weight ratio in a range from about 0.0092:1 to about 0.073:1.

The drying the mixture process may be performed at about 60° C. to about 100° C. for about 6 hours to about 24 hours.

The heat-treating the dried product may be performed at about 700° C. to about 950° C. for about 3 hours to about 20 hours.

The lithium intercalation compound may be an M-doped compound.

According to one or more embodiments, a rechargeable lithium battery includes a positive electrode including the positive active material of the present embodiments; a negative electrode including a negative active material; and an electrolyte.

Other embodiments are included in the following detailed description.

The positive active material for a rechargeable lithium battery according to one or more embodiments of the present invention has excellent cycle-life characteristics.

DETAILED DESCRIPTION

Figure 1:
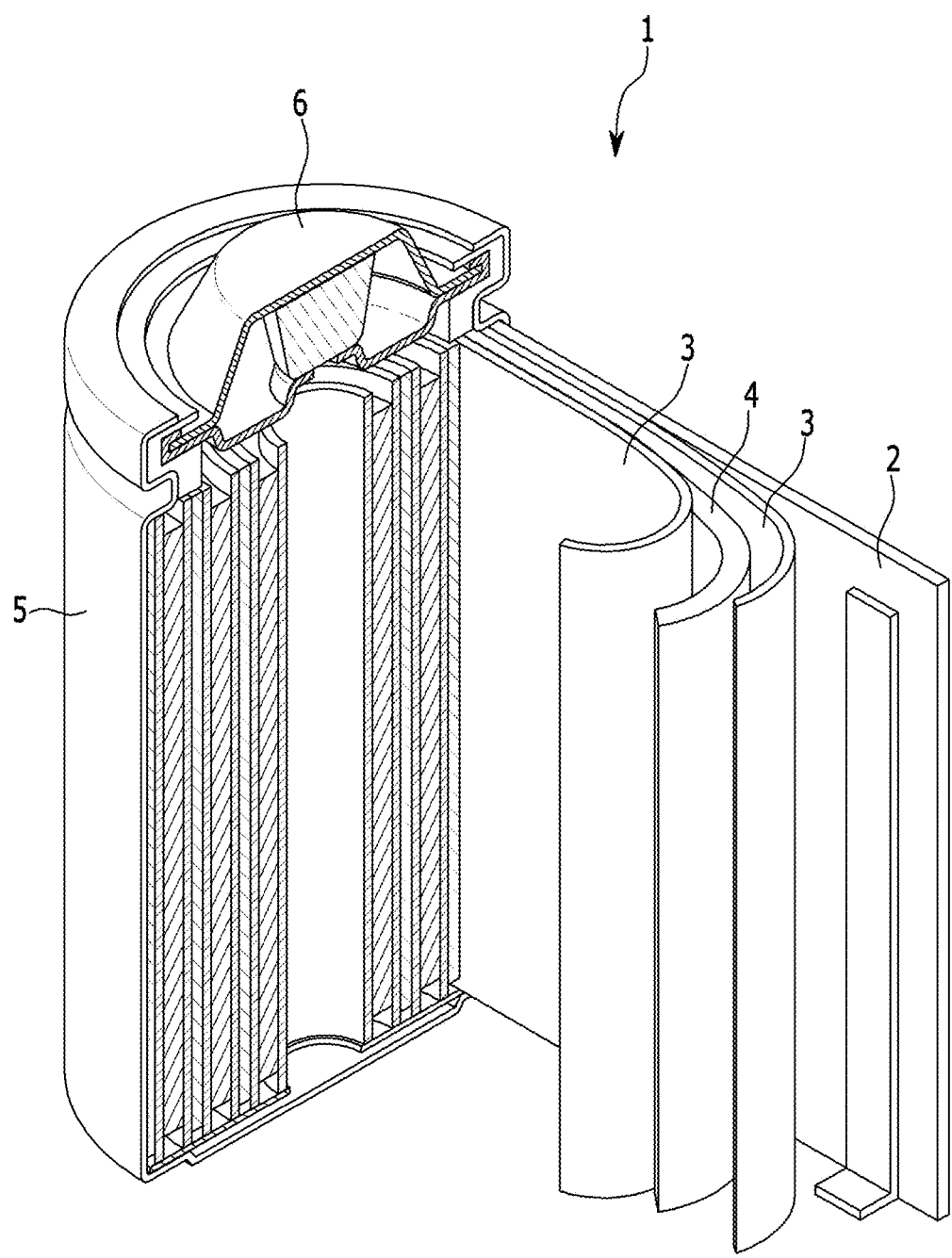
FIG. 1 is a schematic perspective view showing a structure of a lithium rechargeable battery including a positive active material according to one or more embodiments.

Hereinafter, embodiments are described in detail. However, these embodiments are provided for illustrative purposes, and this disclosure is not limited thereto.

Expressions such as "at least one of" and "at least one selected from", when preceding a list of elements, modify the entire list of elements and do not modify the individual elements of the list. Further, the use of "may" when describing embodiments of the present invention refers to "one or more embodiments of the present invention." In addition, as used herein, the terms "use," "using," and "used" may be considered synonymous with the terms "utilize," "utilizing," and "utilized," respectively.

As used herein, the term "substantially," "about," and similar terms are used as terms of approximation and not as terms of degree, and are intended to account for the inherent deviations in measured or calculated values that would be recognized by those of ordinary skill in the art.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112, first paragraph, and 35 U.S.C. § 132(a).

A positive active material according to one or more embodiments includes a lithium intercalation compound; and a lithium titanium oxide represented by Chemical Formula 1, the lithium titanium oxide being positioned on the surface of the lithium intercalation compound.

$$Li_{4-x}M_xTi_yO_{12-z}.$$ 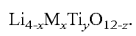 Chemical Formula 1

In the Chemical Formula 1,

0<x≤3, 1≤y≤5, −0.3≤z≤0.3, and

M is an element selected from Mg, Al, Ga, La, Tb, Gd, Ce, Pr, Nd, Sm, Ba, Sr, Ca, and combinations thereof. In one embodiment, M may be an element selected from Mg, Al, Ga, and combinations thereof.

In the Chemical Formula 1, x refers to a doping amount of the M (e.g., the amount of doping element M in the lithium titanium oxide). In the Chemical Formula 1, x may be within the following ranges: 0<x≤3, or 1≤x≤2. When the value of x is within any of these ranges, electrical characteristics at the surface of the active material may be improved.

The lithium titanium oxide may be positioned on the surface of the lithium intercalation compound in a form of an island coating. Herein, the term "island coating" refers to a spherical, semi-spherical, non-spherical, or amorphous shape having a predetermined volume, without being limited thereto. For example, the "island coating" may be a discontinuous coating formed of spherical, semi-spherical, non-spherical, or amorphous shape particles.

In some embodiments, the lithium titanium oxide is doped with M, and the M-doped lithium titanium oxide is positioned on the surface of the lithium intercalation compound. The resulting positive active material exhibits improved ion conductivity and electric conductivity, as compared with a positive active material including a lithium titanium oxide not doped with M positioned on the surface of the lithium intercalation compound, and thus, excellent rate capability and cycle-life characteristics during the charge and discharge of the battery may be obtained.

When the lithium titanium oxide is not a compound represented by the Chemical Formula 1 but instead is, for example, $Li_2TiO_3$ or M-doped $Li_2TiO_3$, or when the compound represented by Chemical Formula 1 is included along with the $Li_2TiO_3$ or the M-doped $Li_2TiO_3$, surface resistance of the resulting active material is relatively high, and the structure of the coating layer on the surface thereof may be relatively easily broken during charge and discharge, and thus, cycle-life characteristics of the battery may not improve or may deteriorate.

The lithium titanium oxide represented by Chemical Formula 1 may be a compound having a spinel structure. The compound having a spinel structure, unlike the compound having a layered structure, can remain stable (without a structural transition) during charge and discharge.

In one embodiment, the lithium titanium oxide may be included in an amount of about 2.0 wt % to about 6.0 wt % based on the total amount (100 wt %) of the positive active material. When the lithium titanium oxide is included within this range, cycle-life characteristics of the battery may be improved, while capacity per gram of an active material is maintained.

The lithium intercalation compound may be an M-doped compound (where M is Mg, Al, Ti, La, Tb, Gd, Ce, Pr, Nd, Sm, Ba, Sr, Ca, or a combination thereof). Herein, the M is doped (included) in an amount of about 0.1 mol % to about 2 mol % based on the total amount (100 mol %) of the lithium intercalation compound. When the M is doped within this range, surface electrical characteristics may be improved.

In some embodiments, the M-doped lithium intercalation compound may be represented by the following chemical formulae.

$Li_aA_{1-b}M_bD_2$ (0.90≤a≤1.8, 0.001<b≤0.2); $Li_aA_{1-b}M_bO_{2-c}D_c$ (0.90≤a≤1.8, 0.001<b≤0.2, 0≤c≤0.05); $Li_aE_{1-b}M_bO_{2-c}D_c$ (0.90≤a≤1.8, 0.001<b≤0.2, 0≤c≤0.05); $Li_aE_{2-b}M_bO_{4-c}D_c$ (0.90≤a≤1.8, 0.001<b≤0.2, 0≤c≤0.05); $Li_aNi_{1-b-c}Co_bM_cD_\alpha$ (0.90≤a≤1.8, 0≤b≤0.5, 0.001<c≤0.2, 0<α≤2); $Li_aNi_{1-b-c}Co_bM_cO_{2-\alpha}T_\alpha$ (0.90≤a≤1.8, 0≤b≤0.5, 0.001<c≤0.2, 0<α<2); $Li_aNi_{1-b-c}Co_bM_cO_{2-\alpha}T_2$ (0.90≤a≤1.8, 0≤b≤0.5, 0.001≤c≤0.2, 0<α<2); $Li_aNi_{1-b-c}Mn_bM_cD_\alpha$ (0.90≤a≤1.8, 0≤b≤0.5, 0.001≤c≤0.2, 0<α≤2); $Li_aNi_{1-b-c}Mn_bM_cO_{2-\alpha}T_\alpha$ (0.90≤a≤1.8, 0≤b≤0.5, 0.001≤c≤0.2, 0<α<2); $Li_aNi_{1-b-c}Mn_bM_cO_{2-\alpha}T_2$ (0.90≤a≤1.8, 0≤b≤0.5, 0.001≤c≤0.2, 0<α<2); $Li_aNi_bE_cM_dO_2$ (0.90≤a≤1.8, 0≤b≤0.9, 0≤c≤0.5, 0.001<d≤0.2); $Li_aNi_bCo_cMn_dM_eO_2$ (0.90≤a≤1.8, 0≤b≤0.9, 0≤c≤0.5, 0≤d≤0.5, 0.001≤e≤0.2); $Li_aNiM_bO_2$ (0.90≤a≤1.8, 0.001≤b≤0.2); $Li_aCoM_bO_2$ (0.90≤a≤1.8, 0.001≤b≤0.2); $Li_aMn_{1-b}M_bO_2$ (0.90≤a≤1.8, 0.001≤b≤0.2); $Li_aMn_2M_bO_4$ (0.90≤a≤1.8, 0.001≤b≤0.2); or $Li_aMn_{1-g}M_gPO_4$ (0.90≤a≤1.8, 0.001≤g≤0.2).

In the above chemical formulae, A is selected from Ni, Co, Mn, and combinations thereof; M is selected from Mg, Al, Ga, La, Tb, Gd, Ce, Pr, Nd, Sm, Ba, Sr, Ca, and combinations thereof; D is selected from O, F, S, P, and combinations thereof; E is selected from Co, Mn, and combinations thereof; and T is selected from F, S, P, and combinations thereof.

In one or more embodiments of the present invention, a method of preparing the positive active material includes mixing a titanium compound-containing liquid and a lithium intercalation compound to prepare a mixture; drying the resulting mixture to obtain a dried product; and heat-treating (e.g., by firing) the dried product. Hereinafter, each step is described in more detail.

First, titanium compound-containing liquid and a lithium intercalation compound are mixed to prepare a mixture.

The titanium compound may be titanium butoxide, titanium isopropoxide, titanium dioxide, or a combination thereof.

The titanium compound-containing liquid may have a concentration (of the titanium compound) of about 1.5 wt % to about 3.0 wt %, based on the total amount of the liquid. When the titanium compound-containing liquid has a concentration within this range, the titanium compound (e.g., the compound represented by Chemical Formula 1) may be successfully formed on the surface of the lithium intercalation compound. When the titanium compound-containing liquid has a concentration out of this range, undesired impurities such as, for example, M-doped $Li_2TiO_3$ and/or the like may be formed.

The titanium compound-containing liquid may be prepared by mixing the titanium compound and a solvent, and agitating the same. The solvent may be ethanol, methanol, or a combination thereof, but is not limited thereto.

The lithium intercalation compound may be an M-doped lithium intercalation compound. When the M-doped lithium intercalation compound is used, the doping element M may be diffused towards the surface of the compound during a firing process and may form an M-doped lithium titanium oxide represented by Chemical Formula 1 on the surface of the lithium intercalation compound.

In the mixing process, a mixing ratio of the titanium compound and the lithium intercalation compound may be a weight ratio ranging from about 0.0092:1 to about 0.073:1. When the titanium compound and the lithium intercalation compound are mixed within this ratio range, capacity characteristics may be improved. When the titanium compound and the lithium intercalation compound are mixed out of this ratio range, capacity per gram of the positive active material may decrease.

Then, the mixture of the titanium compound and the lithium intercalation compound is dried. The drying process may be performed at about 60° C. to about 100° C. for about 6 hours to about 24 hours.

The firing process (following the drying process) may be performed at about 700° C. to about 950° C. for about 3 hours to about 20 hours. In some embodiments, the firing process is performed by increasing the temperature up to about 700° C. to about 950° C. at a rate of about 5° C./min to about 10° C./min and performing the heat treatment at the increased temperature for about 3 hours to about 20 hours.

According to the process of one or more embodiments of the present invention, a starting material that generally remains as an impurity during the manufacturing of a lithium intercalation compound (for example, $Li_2CO_3$ remaining during the manufacturing of $LiCoO_2$), reacts with a titanium compound to form a lithium titanium oxide, such that a doping element M (initially doped on the lithium intercalation compound) is then doped on the lithium titanium oxide. As a result, a positive active material including the lithium intercalation compound and the M-doped lithium titanium oxide represented by the Chemical Formula 1 on the surface of the lithium intercalation compound may be prepared.

One or more embodiments of the present invention provide a rechargeable lithium battery including a positive electrode including the positive active material of embodiments of the present invention; a negative electrode including a negative active material; and an electrolyte.

The positive electrode may include a positive current collector and a positive active material layer formed on the positive current collector. The positive active material layer may include the positive active material of one or more embodiments of the present invention.

In the positive active material layer, the positive active material may be included in an amount of about 90 wt % to about 98 wt % based on the total amount of the positive active material layer.

In some embodiments, the positive active material layer further includes a binder and a conductive material. Herein, the binder and conductive material may be included in an amount of about 1 wt % to about 5 wt %, respectively, based on the total amount of the positive active material layer.

The binder improves binding properties of the positive active material particles with one another and with the current collector. Examples of the binder may include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to provide electrode conductivity. Any suitable electrically conductive material may be used as the conductive material, so long as it does not cause a chemical change in the battery. Non-limiting examples of the conductive material may include a carbon-based material such as natural graphite, artificial graphite, carbon black, acetylene black, ketjen black, denka black, a carbon fiber, and/or the like; a metal-based material such as a metal powder and/or a metal fiber of copper, nickel, aluminum, silver, and/or the like; a conductive polymer such as a polyphenylene derivative; and mixtures thereof.

The current collector may be aluminum (Al), but is not limited thereto.

The negative electrode includes a current collector and a negative active material layer formed on the current collector, and the negative active material layer includes a negative active material.

In some embodiments, the negative active material includes a material that reversibly intercalates/deintercalates lithium ions, a lithium metal, a lithium metal alloy, a material capable of doping/dedoping lithium, and/or a transition metal oxide.

The material that can reversibly intercalate/deintercalate lithium ions includes a carbon material. The carbon material may be any suitable carbon-based negative active material commonly used in connection with lithium ion rechargeable batteries. Non-limiting examples of the carbon material include crystalline carbon, amorphous carbon, and mixtures thereof. The crystalline carbon may be non-shaped, or sheet, flake, spherical, and/or fiber shaped natural graphite and/or artificial graphite. The amorphous carbon may be a soft carbon, a hard carbon, a mesophase pitch carbonization product, fired coke, and/or the like.

Non-limiting examples of the lithium metal alloy include an alloy of lithium and an element selected from Na, K, Rb, Cs, Fr, Be, Mg, Ca, Sr, Si, Sb, Pb, In, Zn, Ba, Ra, Ge, Al, and Sn.

The material capable of doping/dedoping lithium may include Si, a Si—C composite, $SiO_x$ (where $0<x<2$), a Si-Q alloy (where Q is an alkali metal, an alkaline-earth metal, a Group 13 element, a Group 14 element, a Group 15 element, a Group 16 element, a transition element, a rare earth element, or a combination thereof, and Q is not Si), Sn, $SnO_2$, a Sn—R alloy (where R is an alkali metal, an alkaline-earth metal, a Group 13 element, a Group 14 element, a Group 15 element, a Group 16 element, a transition element, a rare earth element, or a combination thereof, and R is not Sn), and/or the like. At least one of the aforementioned materials may be mixed with $SiO_2$. Q and R may each independently be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and combinations thereof.

The transition metal oxide may include vanadium oxide, lithium vanadium oxide, and/or the like.

In the negative active material layer, the negative active material may be included in an amount of about 95 wt % to about 99 wt % based on the total weight of the negative active material layer.

The negative active material layer may include a binder and, optionally, a conductive material. The negative active material layer may include about 1 wt % to about 5 wt % of the binder based on the total weight of the negative active material layer. When the negative active material layer includes a conductive material, the negative active material layer may include about 90 wt % to about 98 wt % of the negative active material, about 1 wt % to about 5 wt % of the binder, and about 1 wt % to about 5 wt % of the conductive material.

The binder improves binding properties of the negative active material particles with one another and with the current collector. In some embodiments, the binder includes a non-water-soluble binder, a water-soluble binder, or a combination thereof.

Non-limiting examples of the non-water-soluble binder include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, and combinations thereof.

Non-limiting examples of the water-soluble binder include a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth)acrylic acid alkyl ester, and combinations thereof.

When a water-soluble binder is used as the binder for the negative electrode, a cellulose-based compound may be further included to provide viscosity. The cellulose-based compound includes at least one selected from carboxymethyl cellulose, hydroxypropylmethyl cellulose, methyl cellulose, and alkali metal salts thereof, but is not limited thereto. The alkali metal may be, for example, Na, K, and/or Li. The cellulose-based compound may be included in an amount of about 0.1 to about 3 parts by weight based on 100 parts by weight of the negative active material.

The conductive material is included to provide electrode conductivity. Any suitable electrically conductive material may be used as the conductive material, so long as it does not cause a chemical change in the battery. Non-limiting examples of the conductive material include a carbon-based material (such as natural graphite, artificial graphite, carbon black, acetylene black, ketjen black, a carbon fiber, and/or the like); a metal-based material (such as a metal powder or a metal fiber of copper, nickel, aluminum, silver, and/or the like); a conductive polymer (such as a polyphenylene derivative); and mixtures thereof.

The current collector may include one selected from a copper foil, a nickel foil, a stainless steel foil, a titanium foil, a nickel foam, a copper foam, a polymer substrate coated with a conductive metal, and combinations thereof, but is not limited thereto.

The negative electrode and the positive electrode may each be manufactured by mixing the respective active material, a conductive material and a binder in a solvent to prepare an active material composition, and coating the composition on a current collector. The electrode manufacturing method should be apparent to those of skill in the art, and thus is not described in detail in the present specification. The solvent may be N-methylpyrrolidone and/or the like. In some embodiments, depending on the binder, an aqueous solvent such as water and/or the like may be used, but the solvent is not limited thereto.

The electrolyte includes an organic solvent and a lithium salt.

The organic solvent serves as a medium of transmitting ions taking part in the electrochemical reaction of the battery.

The organic solvent may include a carbonate-based, ester-based, ether-based, ketone-based, alcohol-based, and/or aprotic solvent. Non-limiting examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Non-limiting examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like. Non-limiting examples of the ether-based solvent include dibutyl ether, tetraglyme, diglyme, dimethoxyethane, 2-methyltetrahydrofuran, tetrahydrofuran, and the like, and non-limiting examples of the ketone-based solvent include cyclohexanone and the like. Non-limiting examples of the alcohol-based solvent include ethyl alcohol, isopropyl alcohol, and the like, and non-limiting examples of the aprotic solvent include nitriles such as R—CN (where R is a C2 to C20 linear, branched, or cyclic hydrocarbon, a double bond, an aromatic ring, or an ether bond); amides such as dimethylformamide; dioxolanes such as 1,3-dioxolane; sulfolanes; and the like.

The organic solvent may be used alone or in a mixture. When the organic solvent is used in a mixture, the mixture ratio can be controlled in accordance with the desired battery performance.

The carbonate-based solvent may include a mixture with a cyclic carbonate and a linear carbonate. The cyclic carbonate and the linear carbonate may be mixed together in a volume ratio of about 1:1 to about 1:9. When the mixture having this volume ratio is used as an electrolyte, the electrolyte may have enhanced performance.

The organic solvent may further include an aromatic hydrocarbon-based organic solvent, in addition to the carbonate-based solvent. The carbonate-based solvent and the aromatic hydrocarbon-based solvent may be mixed together in a volume ratio of about 1:1 to about 30:1.

The aromatic hydrocarbon-based organic solvent may be an aromatic hydrocarbon-based compound represented by the following Chemical Formula 2.

Chemical Formula 2

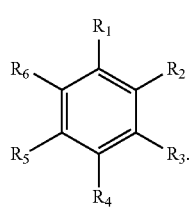

In the Chemical Formula 2, $R_1$ to $R_6$ may be the same or may be different from each other, and may be selected from a hydrogen, a halogen, a C1 to C10 alkyl group, a haloalkyl group, and combinations thereof.

Non-limiting examples of the aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene and combinations thereof.

The electrolyte may further include vinylene carbonate or an ethylene carbonate-based compound represented by the following Chemical Formula 3, in order to improve cycle life.

Chemical Formula 3

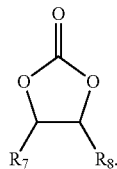

In the Chemical Formula 3, $R_7$ and $R_8$ may be the same or may be different from each other, and may be each independently a hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group, and $R_7$ and $R_8$ are not simultaneously hydrogen.

Non-limiting examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the additive for improving cycle life may be varied in accordance with the desired battery performance.

In one or more embodiments, the lithium salt is dissolved in an organic solvent, supplies lithium ions to the battery, improves transportation of the lithium ions between positive and negative electrodes, and facilitates the basic operation of the rechargeable lithium battery. Non-limiting examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{x+1}SO_2)(C_yF_{2y+1}SO_2)$ (where x and y are natural numbers, e.g., an integer of 1 to 20), LiCl, LiI, and $LiB(C_2O_4)_2$ (lithium bis(oxalato) borate; LiBOB). The lithium salt may be used in a concentration ranging from about 0.1 M to about 2.0 M. When the lithium salt is included at this concentration range, the electrolyte may have excellent performance and lithium ion mobility due to optimal (or good) electrolyte conductivity and viscosity.

The rechargeable lithium battery may further include a separator between the negative electrode and the positive electrode, depending on a kind of the battery. Non-limiting examples of a suitable separator material include polyethylene, polypropylene, polyvinylidene fluoride, and multi-layered structures of these materials such as a polyethylene/polypropylene double-layered separator, a polyethylene/polypropylene/polyethylene triple-layered separator, and/or a polypropylene/polyethylene/polypropylene triple-layered separator.

The rechargeable lithium battery may be classified into a lithium ion battery, a lithium ion polymer battery, and a lithium polymer battery, depending on the kind of the separator and the electrolyte utilized. The rechargeable lithium battery may be cylindrical, prismatic, coin-type (a coin battery), pouch-type (a pouch battery), and/or the like.

In addition, it may be a bulk or a thin film battery, depending on the battery size. Various suitable structures and manufacturing methods for lithium ion batteries pertaining to this disclosure should be apparent to those of skill in the art.

FIG. 1 is a schematic perspective view showing a structure of a rechargeable lithium battery according to one or more embodiments. Referring to FIG. 1, the rechargeable lithium battery 1 includes a positive electrode 2, a negative electrode 4, and a separator 3 between the positive electrode 2 and the negative electrode 4; an electrolyte solution impregnated therein; a battery case 5 including the same; and a sealing member 6 sealing the battery case 5.

Hereinafter, certain examples of embodiments of the present invention and comparative examples are described. These examples, however, are provided for illustrative purposes only and are not in any sense to be interpreted as limiting the scope of the present disclosure.

COMPARATIVE EXAMPLE 1

$Li_2CO_3$, $Co_3O_4$ and Mg were mixed. Herein, a mole ratio of Li, Co and Mg in the final product was 1:0.95:0.05. The mixture was heated up to 1000° C. at a rate of 5° C./min for 6 hours and then naturally cooled down, thus obtaining $LiCo_{0.95}Mg_{0.05}O_2$. Herein, the $Li_2CO_3$ remained in the $LiCo_{0.95}Mg_{0.05}O_2$, and the residual amount of the $Li_2CO_3$ was 0.07 wt %.

Subsequently, the $LiCo_{0.95}Mg_{0.05}O_2$ was heat-treated again at 950° C. for 5 hours, thus preparing a $LiCo_{0.95}Mg_{0.05}O_2$ positive active material.

COMPARATIVE EXAMPLE 2

$Li_2CO_3$, $Co_3O_4$ and MgO were mixed. Herein, a mole ratio of Li, Co and Mg in the final product was 1:0.95:0.05. The mixture was heated up to 1000° C. at a rate of 5° C./min for 6 hours and then naturally cooled down, thus preparing $LiCo_{0.95}Mg_{0.05}O_2$. Herein, the $Li_2CO_3$ remained in the $LiCo_{0.95}Mg_{0.05}O_2$, and the residual amount of the $Li_2CO_3$ was 0.07 wt %.

A titanium butoxide ethanol solution having a concentration of 0.46 wt % was prepared by adding titanium butoxide to ethanol and agitating the mixture at room temperature for about 2 hours.

50 g of the prepared $LiCo_{0.95}Mg_{0.05}O_2$ was added to 50 g of the titanium butoxide ethanol solution, and the resulting mixture was agitated at room temperature for 2 hours. The obtained mixture was dried in an 80° C. oven for 24 hours.

The dried powder was heated up to 950° C. at 5° C./min in a furnace under an air atmosphere and then heat-treated at 950° C. for 5 hours. The heat-treated product was then cooled down, thus obtaining a positive active material. The positive active material included the $LiCo_{0.95}Mg_{0.05}O_2$ lithium intercalation compound and a $Li_{2-x}Mg_xTiO_3$ (x=0.048) compound coated on the surface of the lithium intercalation compound in a form of an island coating.

The resulting positive active material included 99.6 wt % of the lithium intercalation compound and 0.4 wt % of the $Li_{2-x}Mg_xTiO_3$.

COMPARATIVE EXAMPLE 3

A positive active material was prepared according to the same (or substantially the same) method as in Comparative Example 2, except a titanium butoxide ethanol solution having a concentration of 0.90 wt %, instead of a concentration of 0.46 wt %, was prepared by changing the addition amount of titanium butoxide. In the resulting positive active material, a $Li_{2-x}Mg_xTiO_3$ (x=0.37) compound, instead of $Li_{2-x}Mg_xTiO_3$ (x=0.048), was coated on the surface of a $LiCo_{0.95}Mg_{0.05}O_2$ lithium intercalation compound in a form of an island coating. In other words, the $Li_{2-x}Mg_xTiO_3$ compound contacted the surface of the lithium intercalation compound and formed a coating layer thereon. In the resulting positive active material, the lithium intercalation compound was included in an amount of 99.35 wt %, and the $Li_{2-x}Mg_xTiO_3$ was included in an amount of 0.65 wt %.

COMPARATIVE EXAMPLE 4

A positive active material was prepared according to the same (or substantially the same) method as in Comparative Example 2 except $LiCoO_2$ was used instead of the $LiCo_{0.95}Mg_{0.05}O_2$ as the lithium intercalation compound and a titanium butoxide ethanol solution having a concentration of 1.80 wt %, instead of a concentration of 0.46 wt %, was prepared by changing the addition amount of the titanium butoxide. In the resulting positive active material, $Li_{4-x}Mg_xTi_5O_{12}$ (x=0.48), instead of $Li_{2-x}Mg_xTiO_3$ (x=0.048), was coated on the surface of the lithium intercalation compound. The $LiCoO_2$ lithium intercalation compound was included in an amount of 95.1 wt %, and the $Li_{4-x}Mg_xTi_5O_{12}$ (x=0.48) was included in an amount of 4.9 wt %.

COMPARATIVE EXAMPLE 5

50 g of the $LiCo_{0.95}Mg_{0.05}O_2$ prepared according to Comparative Example 2 was mixed with 2.5 g of $Li_4Ti_5O_{12}$ powder.

The mixed powder was heated up to 950° C. at 5° C./min under an air atmosphere and then heat-treated at 950° C. for 5 hours. The heat-treated product was cooled down, thus obtaining a positive active material. The positive active material included the $LiCo_{0.95}Mg_{0.05}O_2$ compound coated with the $Li_4Ti_5O_{12}$. Herein, the $Li_4Ti_5O_{12}$ was included in an amount of 5 wt % based on the total weight of the $LiCo_{0.95}Mg_{0.05}O_2$ positive active material.

COMPARATIVE EXAMPLE 6

A positive active material was prepared according to the same (or substantially the same) method as in Comparative Example 2, except that a titanium butoxide ethanol solution having a concentration of 1.35 wt %, instead of a concentration of 0.46 wt %, was prepared by changing the addition amount of titanium butoxide. In the resulting positive active material, $Li_{4-x}Mg_xTi_5O_{12}$ (x=0.37) was additionally coated on the surface of a $Li_{2-x}Mg_xTiO_3$ compound (x=0.048) coated on the surface of a $LiCo_{0.95}Mg_{0.05}O_2$ lithium intercalation compound in a form of an island coating. In other words, the $Li_{2-x}Mg_xTiO_3$ compound was contacting the surface of the lithium intercalation compound and the $Li_{4-x}Mg_xTi_5O_{12}$ was positioned on the surface of the $Li_{2-x}Mg_xTiO_3$ compound, that is, a double-layered coating layer was formed. In the resulting positive active material, the lithium intercalation compound was included in an amount of 96.39 wt %, the $Li_{2-x}Mg_xTiO_3$ was included in an amount of 0.04 wt %, and the $Li_{4-x}Mg_xTi_5O_{12}$ was included in an amount of 3.57 wt %.

EXAMPLE 1

A positive active material was prepared according to the same (or substantially the same) method as in Comparative Example 2, except that a titanium butoxide ethanol solution having a concentration of 1.80 wt %, instead of a concentration of 0.46 wt %, was prepared by changing the addition amount of titanium butoxide. In the resulting positive active material, $Li_{4-x}Mg_xTi_5O_{12}$ (x=0.48) compound, instead of $Li_{2-x}Mg_xTiO_3$ (x=0.048) compound, was coated on the surface of a $LiCo_{0.95}Mg_{0.05}O_2$ lithium intercalation compound in a form of an island coating. The lithium intercalation compound was included in an amount of 95.1 wt %, and the $Li_{4-x}Mg_xTi_5O_{12}$ was included in an amount of 4.9 wt %.

EXAMPLE 2

A positive active material was prepared according to the same (or substantially the same) method as in Comparative Example 2, except that a titanium butoxide ethanol solution having a concentration of 2.23 wt %, instead of a concentration of 0.46 wt %, was prepared by changing the addition amount of titanium butoxide. In the resulting positive active material, $Li_{4-x}Mg_xTi_5O_{12}$ (x=0.6) compound, instead of $Li_{2-x}Mg_xTiO_3$ (x=0.048) compound, was coated on the surface of a $LiCo_{0.95}Mg_{0.05}O_2$ lithium intercalation compound in a form of an island coating. The lithium intercalation compound was included in an amount of 94.1 wt %, and the $Li_{4-x}Mg_xTi_5O_{12}$ was included in an amount of 5.9 wt %.
Evaluation 1

Figure 2A:
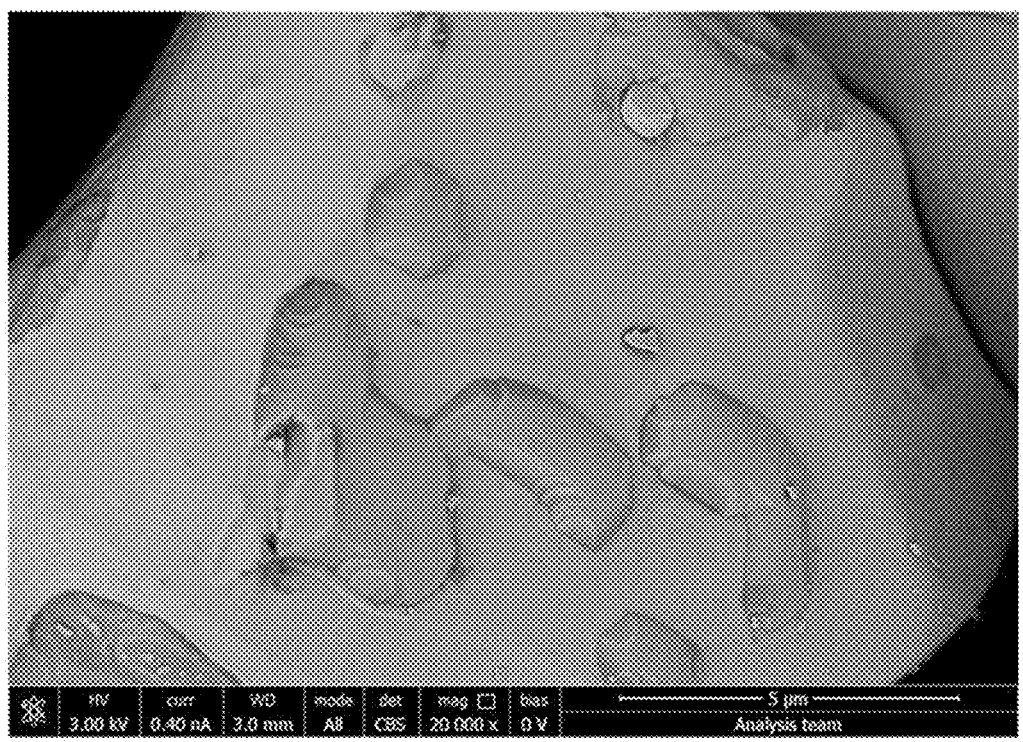
FIG. 2A is a scanning electron microscope (SEM) photograph showing the surface of the Mg-doped positive active material prepared according to Example 1.
Figure 2B:
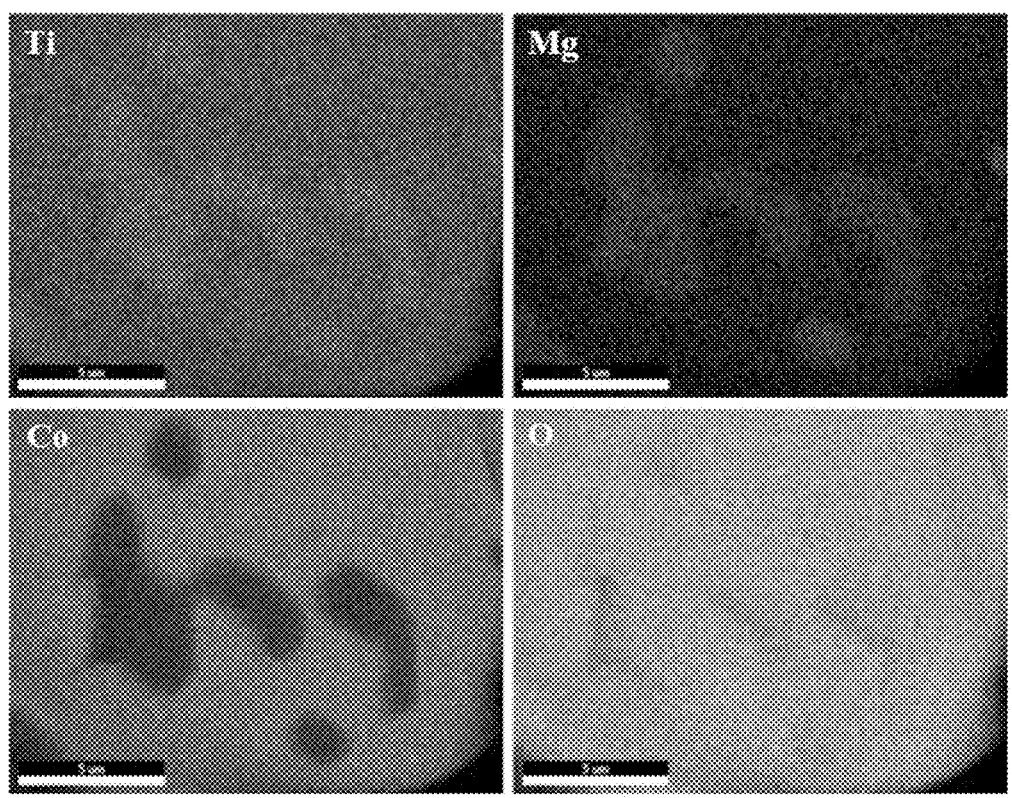
FIG. 2B is an energy dispersive X-ray (EDX) photograph showing element distribution at the surface of the Mg-doped positive active material prepared according to Example 1.

FIG. 2A is a SEM photograph showing the positive active material according to Example 1, and FIG. 2B is an EDX photograph showing Ti, Mg, Co, and O elements on the surface of the positive active material according to Example 1. As shown in FIG. 2B, Ti and Mg were simultaneously positioned on the surface of the active material. This result shows that Mg-a doping element in the $LiCo_{1-x}Mg_xO_2$-was diffused into the coating layer during the heat treatment.

Figure 3A:
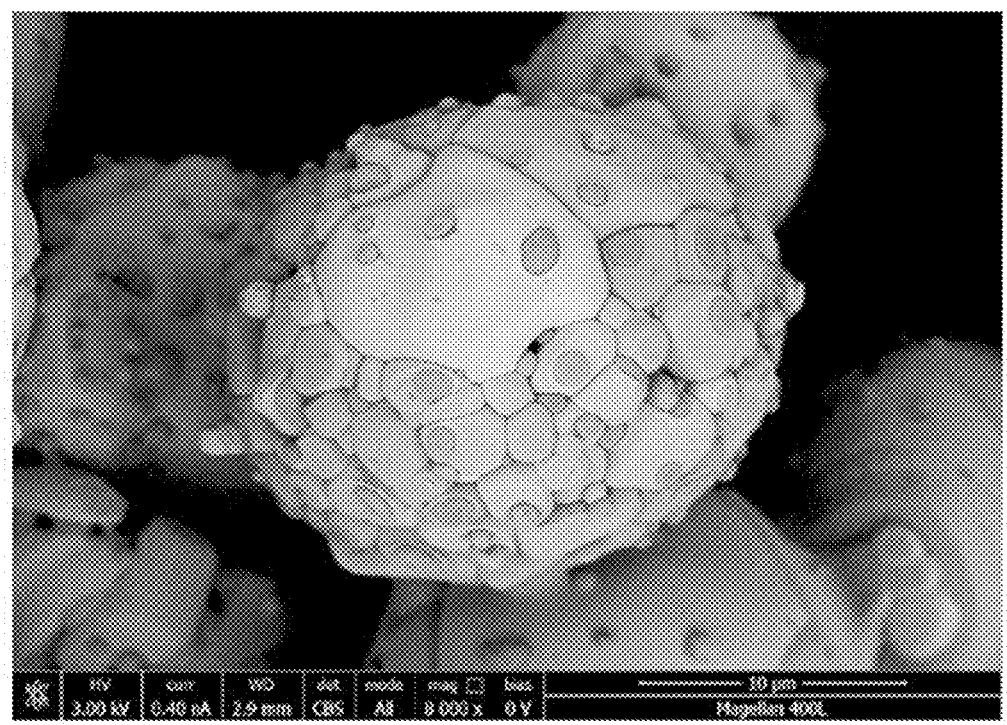
FIG. 3A is a SEM photograph showing the surface of the Mg-doped positive active material prepared according to Comparative Example 5.
Figure 3B:
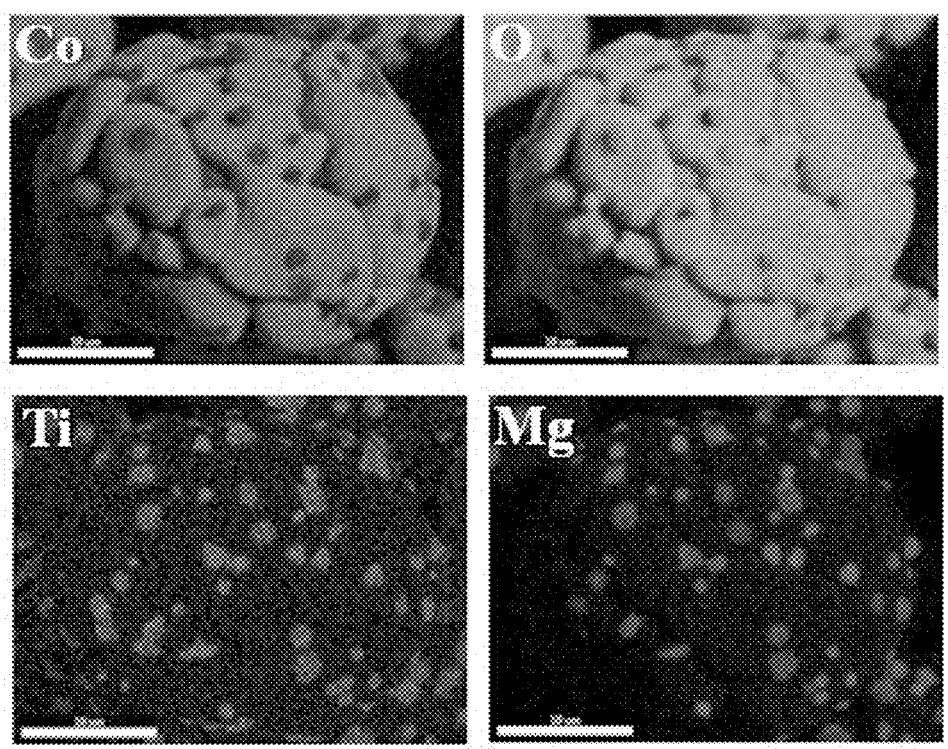
FIG. 3B is an EDX photograph showing the element distribution at the surface of the Mg-doped positive active material prepared according to Comparative Example 5.

FIG. 3A is a SEM photograph showing the positive active material according to Comparative Example 5, and FIG. 3B is an EDX photograph showing Ti, Mg, Co, and O elements on the surface of the positive active material according to Comparative Example 5. As illustrated in FIG. 3B, Mg was diffused into a coating layer, similar to the results illustrated FIG. 2B, even though the appearances of the two coatings were different.
Evaluation 2

Figure 4A:
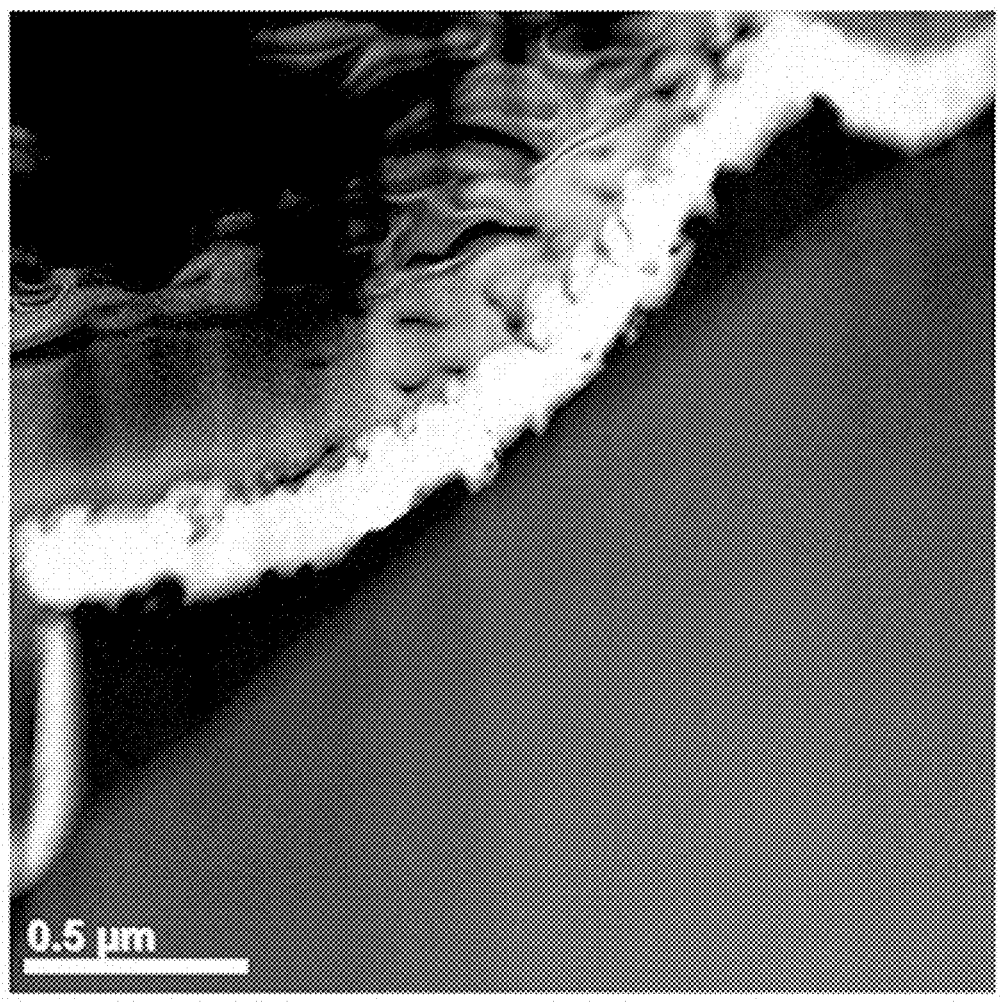
FIG. 4A is a transmission electron microscope (TEM) photograph showing the surface of the positive active material prepared according to Comparative Example 2.
Figure 4B:
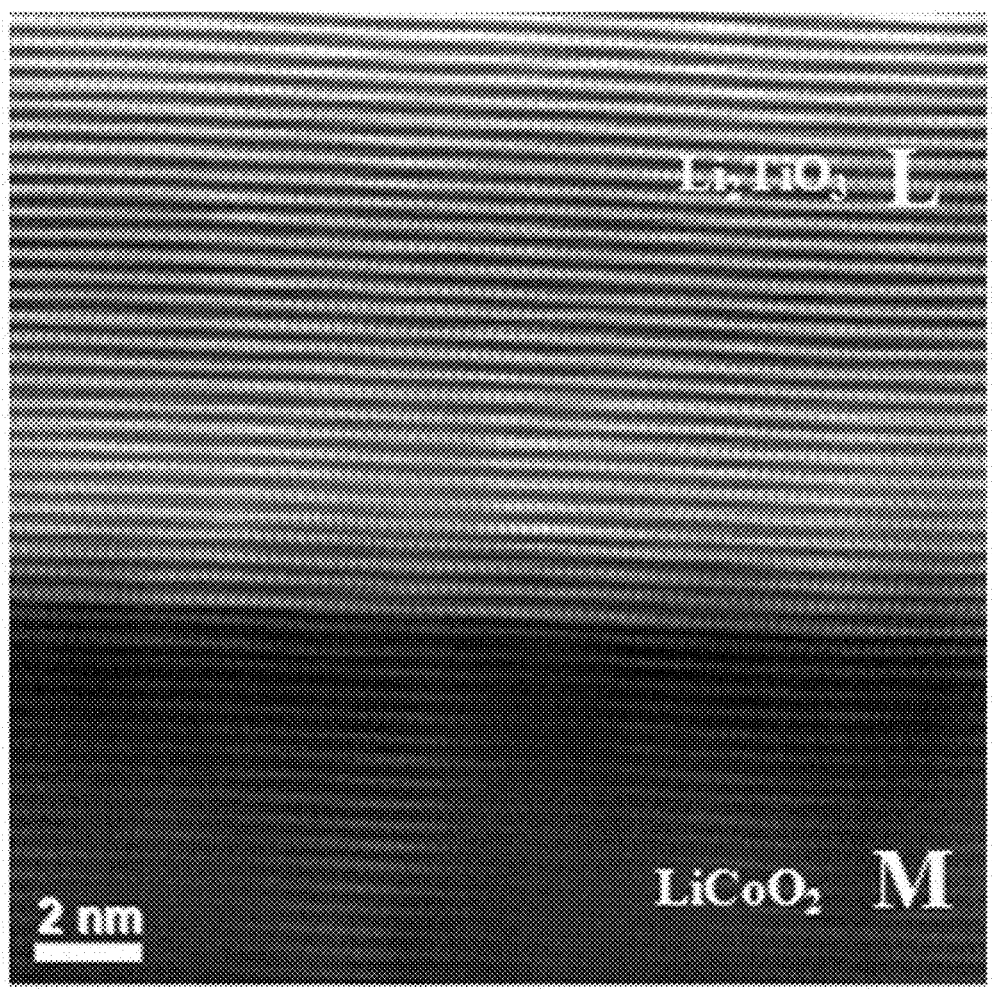
FIG. 4B is a scanning transmission electron microscope photograph of the cross-section of the positive active material prepared according to Comparative Example 2.
Figure 4C:
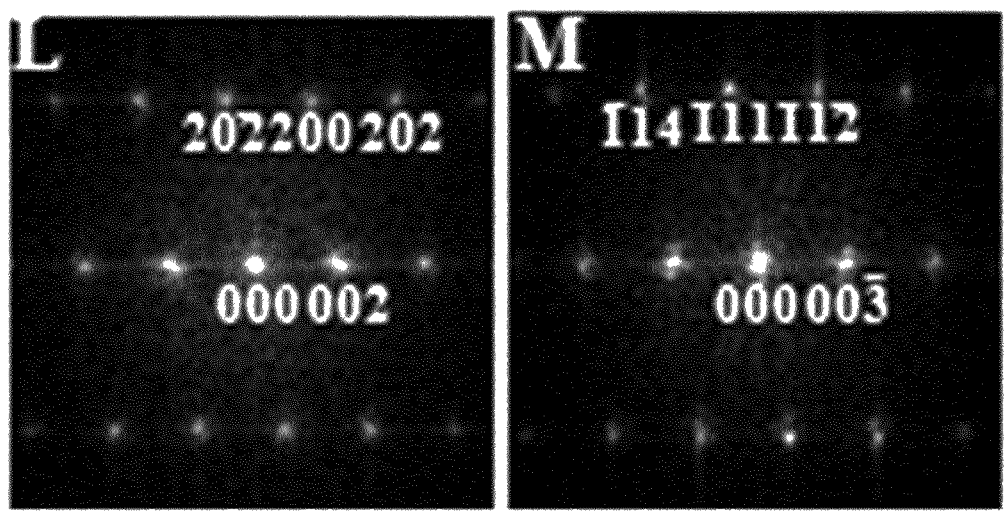
FIG. 4C shows a FFT (fast Fourier transform) pattern of the positive active material prepared according to Comparative Example 2.

FIG. 4A is a TEM photograph showing the surface of the active material according to Comparative Example 2. In addition, FIG. 4B is a scanning transmission electron microscope (STEM) image showing the cross-section of the active material Comparative Example 2 and illustrating the coating layer structure of the active material, and FIG. 4C is a FFT pattern (a fast Fourier transform pattern) showing the coating layer structure of the active material of Comparative Example 2. In FIG. 4C, the L and M show the FFT pattern respectively corresponding to the L and M in FIG. 4B. In FIG. 4B, Mg is not referenced in the $LiCoO_2$ and the $Li_2TiO_3$, but both compounds included Mg. Accordingly, referring to the results of FIGS. 4A, 4B and 4C, it was found that a coating layer on the surface of the active material according to Comparative Example 2 had a $Li_{2-x}Mg_xTiO_3$ (x=0.048) structure.

Figure 5A:
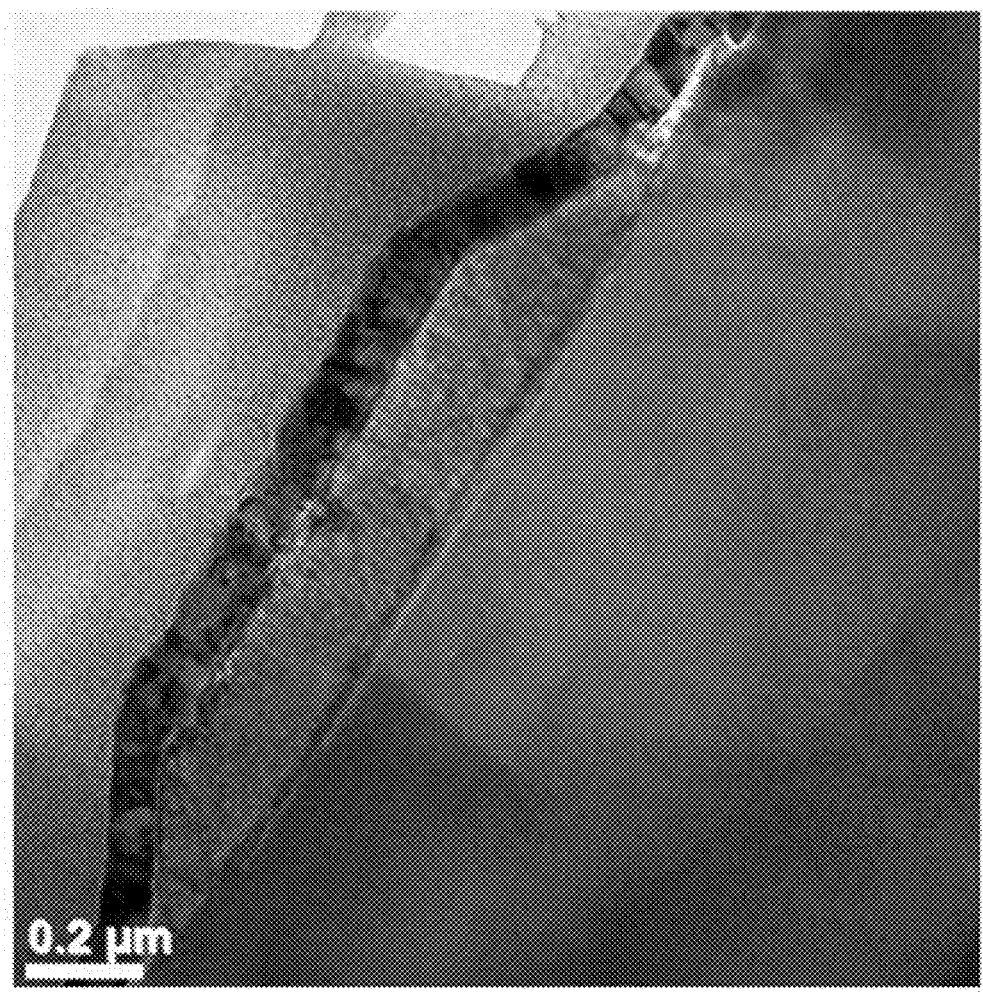
FIG. 5A is a TEM photograph showing the surface of the positive active material prepared according to Comparative Example 6.
Figure 5B:
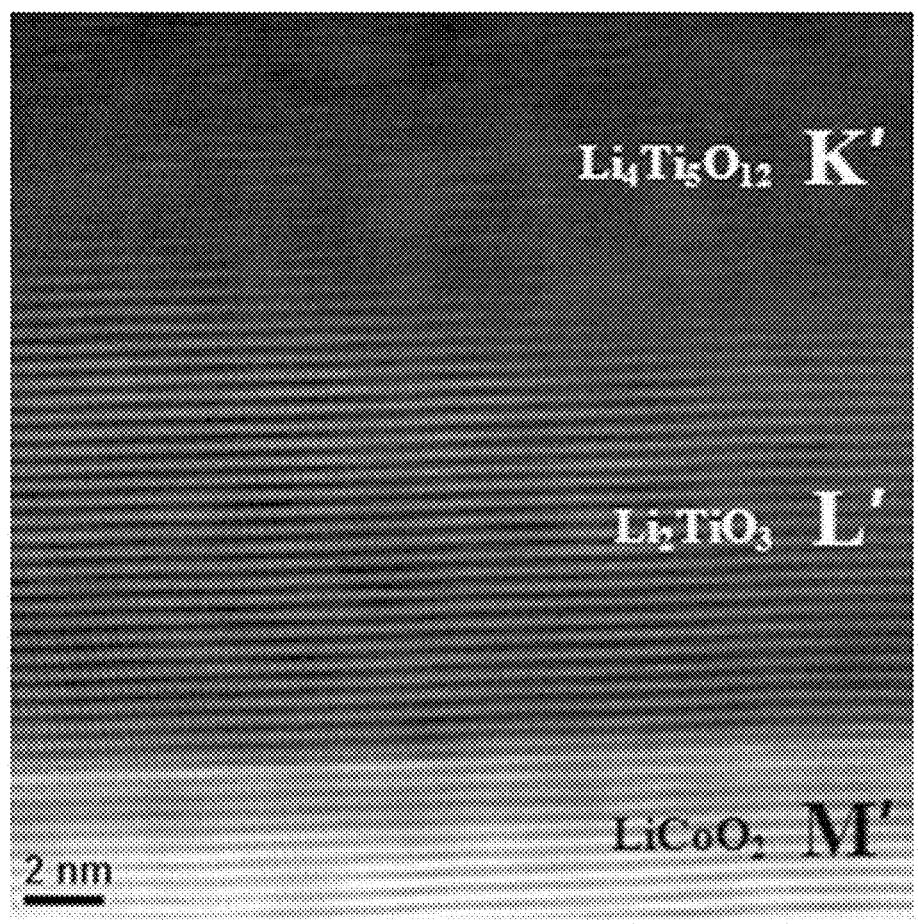
FIG. 5B is a scanning transmission electron microscope photograph of the cross-section of the positive active material prepared according to Comparative Example 6.
Figure 5C:
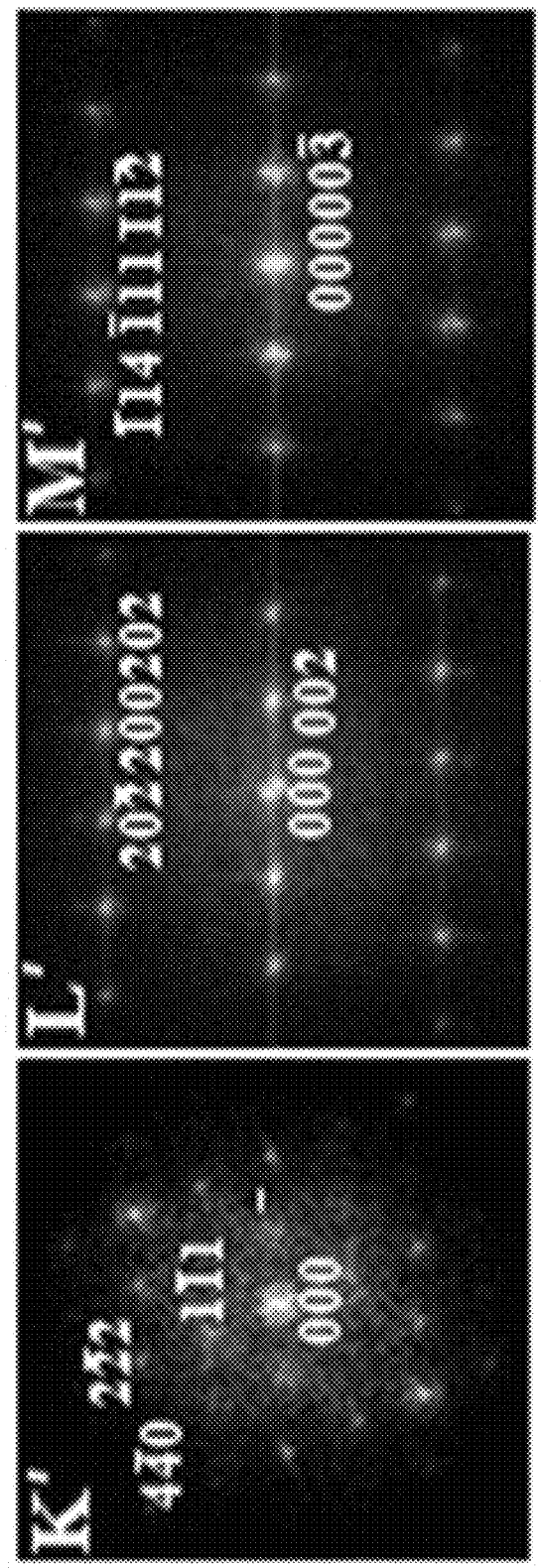
FIG. 5C shows a FFT (fast Fourier transform) pattern of the positive active material prepared according to Comparative Example 6.

In addition, FIG. 5A is a TEM photograph showing the surface of the active material according to Comparative Example 6, FIG. 5B is a scanning transmission electron microscope image showing the cross-section of the active material according to Comparative Example 6 and illustrating the coating layer structure of the active material, and FIG. 5C is a FFT pattern showing the coating layer structure of the active material according to Comparative Example 6. In FIG. 5C, K', L' and M' indicate the FFT pattern respectively corresponding to K', L', M' in FIG. 5B. As shown in FIG. 5B, the coating layer had a bilayer structure, where the lower L' part was $Li_2TiO_3$, and the upper K' part was $Li_4Ti_5O_{12}$. In FIG. 5B, Mg is not referenced in $LiCoO_2$, $Li_2TiO_3$ and $Li_4Ti_5O_{12}$, but all compounds included Mg.

Figure 6A:
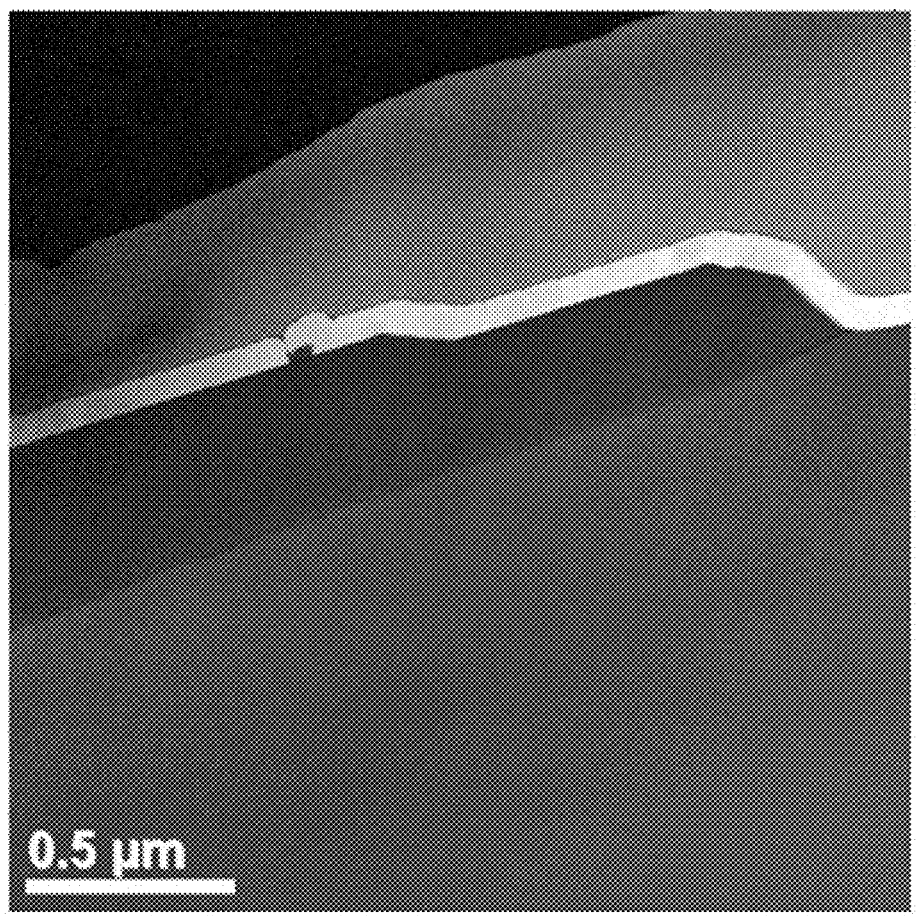
FIG. 6A is a TEM photograph showing the surface of the positive active material prepared according to Example 2.
Figure 6B:
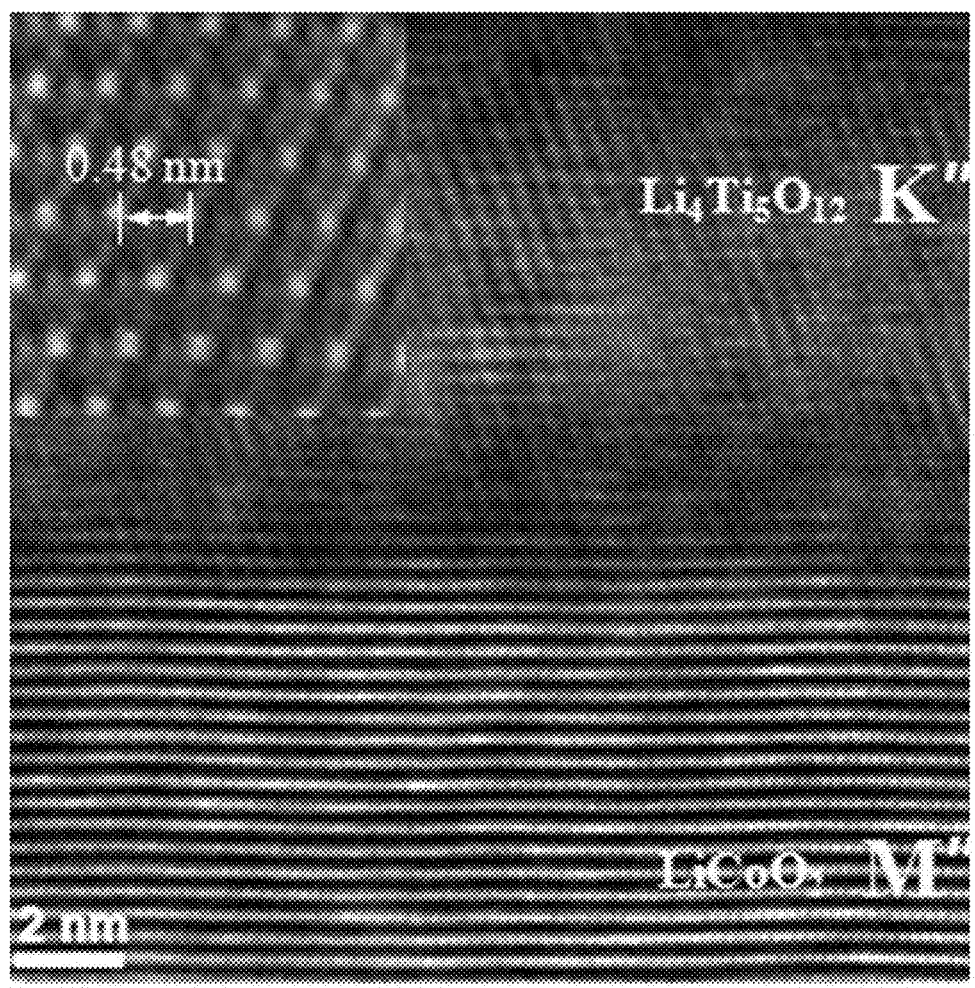
FIG. 6B is a scanning transmission electron microscope photograph of the cross-section of the positive active material prepared according to Example 2.
Figure 6C:
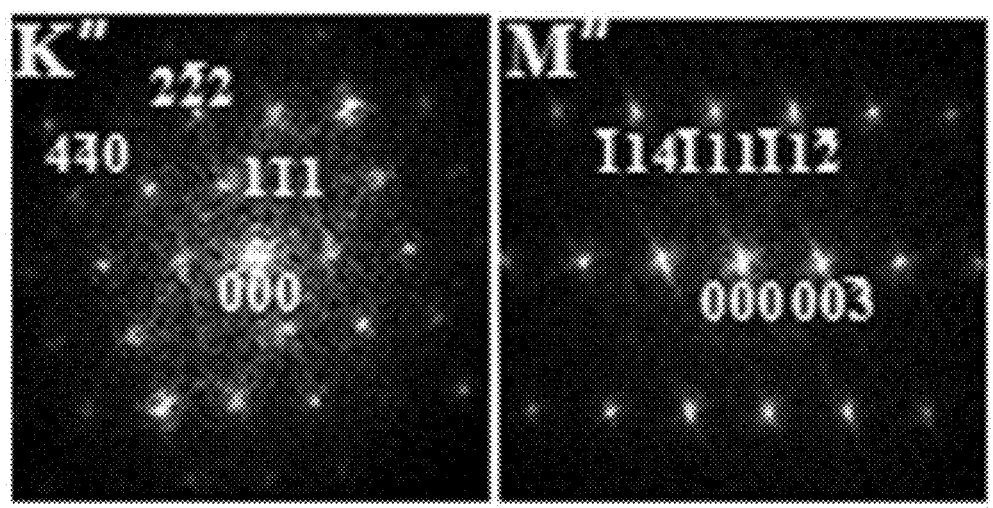
FIG. 6C shows a FFT (fast Fourier transform) pattern of the positive active material prepared according to Example 2.

FIG. 6A is a TEM photograph showing the surface of the active material according to Example 2, FIG. 6B is a scanning transmission electron microscope photograph showing the surface of the active material according to Example 2 and illustrating the coating layer structure of the active material, and FIG. 6C is a FFT pattern showing the coating layer structure of the active material according to Example 2. In FIG. 6C, K" and M" indicate the FFT patterns respectively corresponding to K" and M" in FIG. 6B. In FIG. 6B, Mg is not referenced in $LiCoO_2$ and $Li_4Ti_5O_{12}$, but all compounds included Mg. Accordingly, the coating layer on the surface of the active material according to Example 2 had a structure of $Li_4Ti_5O_{12}$ doped with Mg on the surface.

The results of FIGS. 4A to 6C illustrate that as the amount of titanium butoxide was increased, the compound comprising the coating layer on the surface of the lithium intercalation compound changed from $Li_2TiO_3$ to $Li_4Ti_5O_{12}$.

EXAMPLES 3 and 4

96 wt % of each positive active material according to Examples 1 and 2, 2 wt % of a polyvinylidene fluoride binder and 2 wt % of a denka black conductive material were mixed in an N-methyl pyrrolidone solvent, thus preparing a positive active material slurry.

The positive active material slurry was coated on an Al foil, and then dried and compressed, thus manufacturing a positive electrode.

The positive electrode was used with a lithium metal counter electrode and an electrolyte solution to manufacture a half-cell utilizing one or more processes commonly known to those of skill in the art. Herein, the electrolyte solution was prepared by mixing ethylene carbonate, ethylmethyl carbonate and dimethyl carbonate in a volume ratio of 3:3:4 to obtain an organic solvent and dissolving 1.15 M $LiPF_6$ (a lithium salt) therein.

COMPARATIVE EXAMPLE 7 to 12

96 wt % of each positive active material according to Comparative Examples 1 to 6, 2 wt % of a polyvinylidene fluoride binder and 2 wt % of a denka black conductive material were mixed in an N-methyl pyrrolidone solvent, thus preparing a positive active material slurry.

The positive active material slurry was coated on an Al foil, and then dried and compressed, thus manufacturing a positive electrode.

The positive electrode was used with a lithium metal counter electrode and an electrolyte solution to manufacture a half-cell utilizing one or more processes commonly known to those of skill in the art. Herein, the electrolyte solution was prepared by mixing ethylene carbonate, ethylmethyl carbonate and dimethyl carbonate in a volume ratio of 3:3:4 to obtain an organic solvent and dissolving 1.15 M $LiPF_6$ (a lithium salt) therein.
Evaluation 3

Figure 7A:
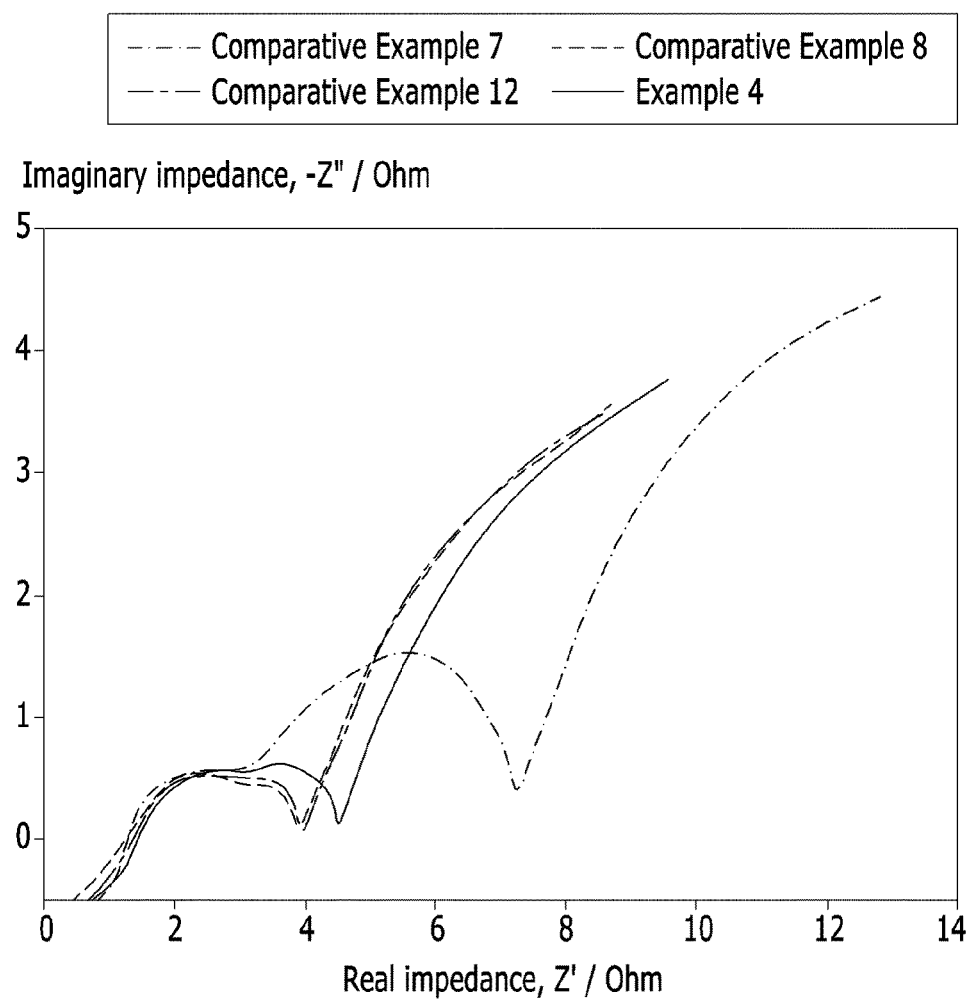
FIG. 7A is a graph showing initial resistances of the battery cells prepared according to Example 4, and Comparative Examples 7, 8 and 12.
Figure 7B:
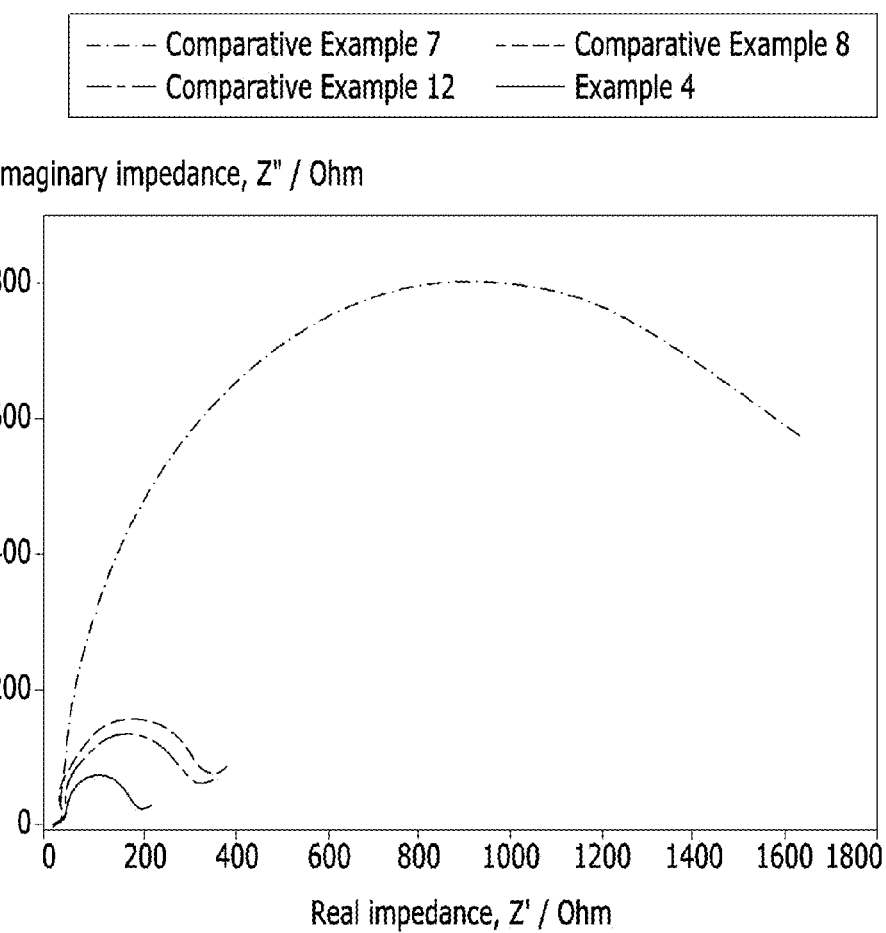
FIG. 7B is a graph showing resistances of the battery cells prepared according to Example 4, and Comparative Examples 7, 8 and 12 after 50 cycles.

FIG. 7A shows the initial impedance of the cells according to Example 4 and Comparative Examples 7, 8 and 12, and FIG. 7B shows the impedance of these cells after 50 charges and discharges. As shown in FIG. 7A, the cells of Example 4 and Comparative Examples 8 and 12 showed similar initial surface impedance, and thus, the coating layer including $Li_{2-x}Mg_xTiO_3$ having a layered structure or the coating layer including $Li_{4-x}Mg_xTiO_{12}$ having a spinel structure (as in Example 4) showed almost similar surface impedance. However, as shown in FIG. 7B, the cell of Example 4 showed lower surface impedance than the cells of Comparative Examples 7, 8 and 12 after 50 cycles.

Evaluation 4

Figure 8:
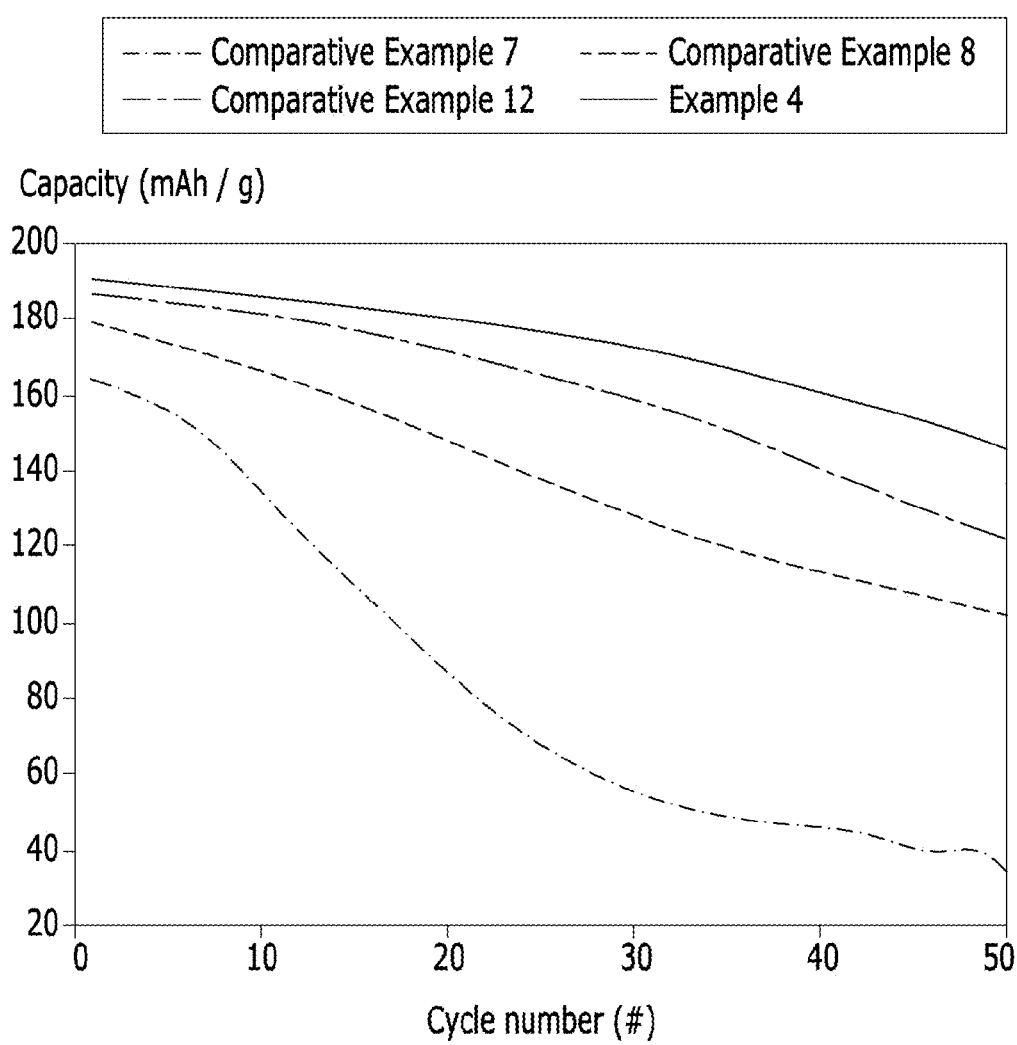
FIG. 8 is a graph showing cycle-life characteristics of the battery cells prepared according to Example 4, and Comparative Examples 7, 8 and 12.

The rechargeable lithium battery cells of Example 4 and Comparative Example 7, 8 and 12 were respectively 50 times charged and discharged at 0.5 C, their residual capacities depending on a charge and discharge cycle were measured, and the results are provided in FIG. 8. As shown in FIG. 8, the cell of Example 4 showed significantly better cycle-life characteristics than the cell of Comparative Example 8. Accordingly, although the cells of Example 4 and Comparative Example 8 showed similar surface impedance (as illustrated in FIG. 7A), the cell of Comparative Example 8 showed significantly more deteriorated cycle-life after charges and discharges than the cell of Example 4.

Evaluation 5

Figure 9:
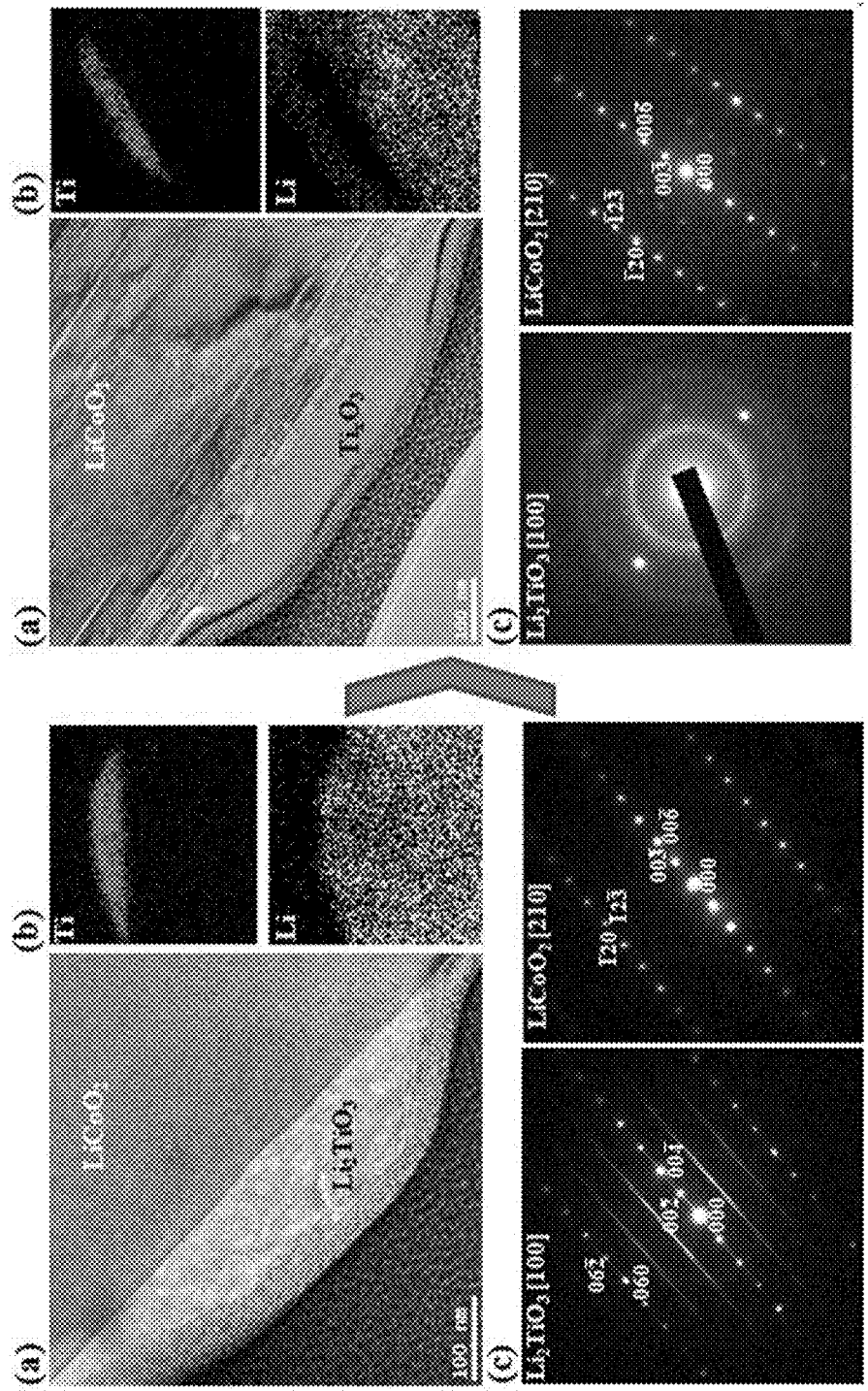
FIG. 9 is a photograph showing the state of the positive active material before and after charging the cell prepared according to Comparative Example 8.
Figure 10:
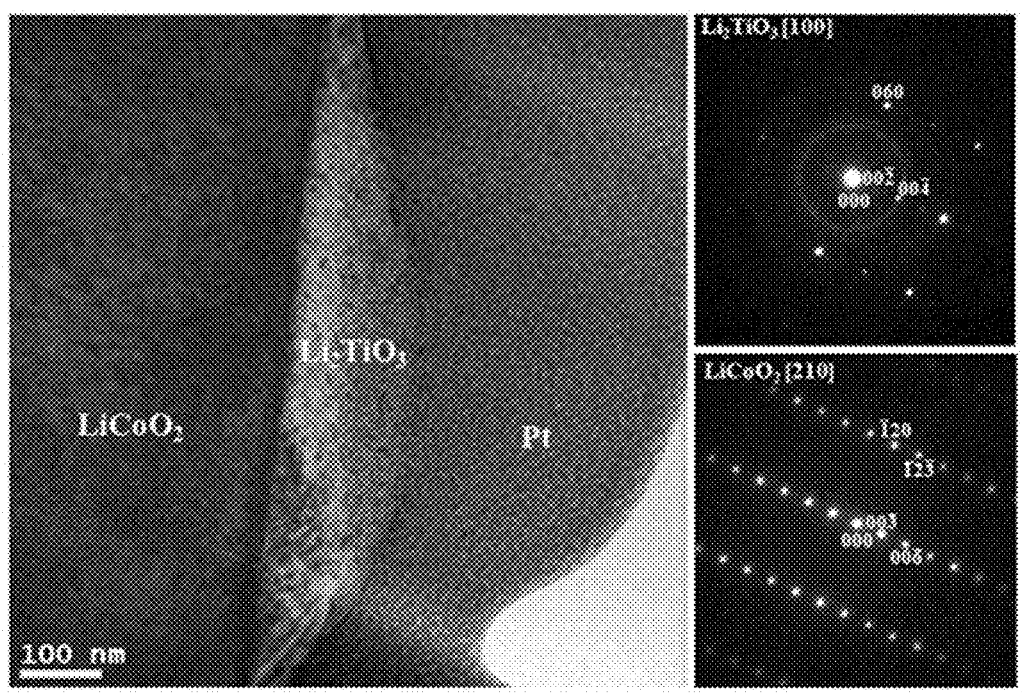
FIG. 10 is a transmission electron microscope (TEM) photograph of the positive active material according to Comparative Example 11 after 50 charges and discharges.

FIG. 9 is a TEM photograph of the positive active material before and after charging the cell of Comparative Example 8 (a), an elemental analysis thereof (b) and a diffraction pattern photograph thereof (c), and FIG. 10 is a TEM photograph of the positive active material of Comparative Example 11 after 50 charges and discharges, an elemental analysis thereof and a diffraction pattern photograph thereof. As shown in FIG. 9, the coating layer of Comparative Example 8 showed a structural change during the charge. In other words, the diffraction pattern (c) before the charge in FIG. 9 was changed into a ring pattern after the charge, which shows that the structure of the coating layer was broken and changed from a single crystal structure to a polycrystal structure. In addition, the change into the polycrystal continuously occurred as a cycle progressed, as can be seen from the results in FIG. 10 which shows the same change in the transmission electron microscope photograph of the positive active material of Comparative Example 11 after 50 times charging and discharging the cell. As shown in FIG. 10, the ring pattern (indicative of a polycrystal structure) was shown after 50 charges and discharges, and this is at least partially due to the fact that lithium in $Li_2TiO_3$ was deintercalated during the charge.

Figure 11:
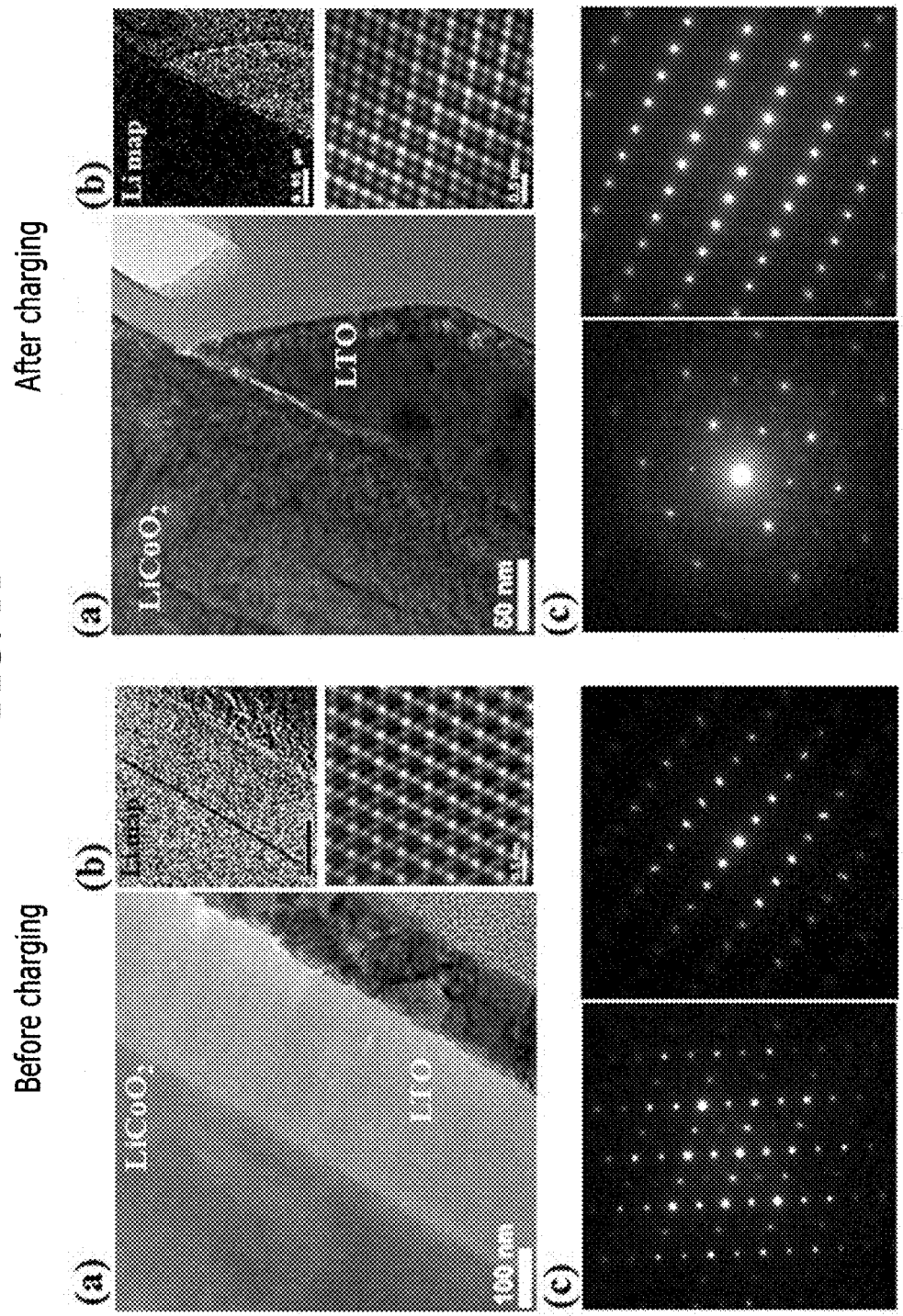
FIG. 11 is a photograph showing the state of the positive active material before and after charging the cell prepared according to Example 4.

In contrast, as shown in FIG. 11, the coating layer of Example 4 maintained a structure during the charge. The results of FIG. 11 indicate that Li was present in the coating layer after the charge and that its diffraction pattern remained almost unchanged after charge and discharge. Accordingly, cycle-life characteristics of the battery cell were improved.

In other words, when Li is deintercalated from the coating layer during charge, it should be intercalated again during discharge. However, when is not intercalated again and does not go back to an active material because there is a structural change in the coating layer, like in Comparative Examples (e.g., in Comparative Example 1), the amount of Li capable of participating in the reactions of the battery decreases. In addition, such Li may react with an electrolyte solution to form a coating layer on the surface or may exist in a resistance state and thus, may increase resistance of the battery. Accordingly, the active material of Comparative Examples (e.g., of Comparative Example 1), showed deteriorated cycle-life characteristics and increased resistance.

While this disclosure has been described in connection with what is presently considered to be practical embodiments, it is to be understood that the invention is not limited to the disclosed embodiments, but, on the contrary, is intended to cover various modifications and equivalent arrangements included within the spirit and scope of the appended claims and equivalents thereof. Therefore, the aforementioned embodiments should be understood to be for illustrative purposes only and not limiting the present invention in any way.

What is claimed is:

1. A positive active material for a rechargeable lithium battery, the positive active material comprising
   a lithium intercalation compound; and
   a lithium titanium oxide represented by Chemical Formula 1 on the surface of and being different from the lithium intercalation compound:

   Chemical Formula 1 wherein
   $0<x\le3$,
   $1\le y\le5$,
   $-0.3\le z\le0.3$,
   and
   M is selected from the group consisting of Mg, Al, Ga, La, Tb, Gd, Ce, Pr, Nd, Sm, Ba, Sr, Ca, and combinations thereof,
   wherein the lithium titanium oxide is included in an amount of about 2.0 wt % to about 6.0 wt % based on 100 wt % of the positive active material, the lithium intercalation compound being greater in amount than the lithium titanium oxide.

2. The positive active material for a rechargeable lithium battery of claim 1, wherein the lithium titanium oxide is $Li_{4-x}M_xTi_5O_{12}$ ($0<x\le3$).

3. The positive active material for a rechargeable lithium battery of claim 1, wherein the lithium titanium oxide has a spinel structure.

4. The positive active material for a rechargeable lithium battery of claim 1, wherein the lithium intercalation compound is an M-doped compound, and
   wherein M is selected from the group consisting of Mg, Al, Ti, La, Tb, Gd, Ce, Pr, Nd, Sm, Ba, Sr, Ca, and combinations thereof.

5. The positive active material for a rechargeable lithium battery of claim 4, wherein the M is doped in an amount of about 0.1 mol % to about 2 mol % based on 100 mol % of the lithium intercalation compound.

6. A rechargeable lithium battery comprising:
   a positive electrode including the positive active material of claim 1;
   a negative electrode including a negative active material; and
   an electrolyte.

7. The positive active material for a rechargeable lithium battery of claim 1, wherein the lithium titanium oxide is on the surface of the lithium intercalation compound in a form of an island coating.

8. A method of preparing a positive active material for a rechargeable lithium battery, the method comprising:
   mixing titanium compound-containing liquid and a lithium intercalation compound to prepare a mixture, the titanium compound of the titanium compound-containing liquid being selected from titanium butoxide, titanium isopropoxide, titanium dioxide, and combinations thereof;
   drying the mixture to obtain a dried product; and heat-treating the dried product by increasing the temperature up to about 700° C. to about 950° C. at a rate of about 5° C./min to about 10°C./min;

wherein the positive active material comprises a lithium intercalation compound and a lithium titanium oxide represented by Chemical Formula 1 on the surface of and being different from the lithium intercalation compound:

$$Li_{4-x}M_xTi_yOi_{2-z},  \quad \text{Chemical Formula 1}$$

wherein 0≤x≤3,

1≤y≤5,

−0.3≤z≤0.3 and M is selected from the group consisting of Mg, Al, Ga, La, Tb, Gd, Ce, Pr, Nd, Sm, Ba, Sr, Ca, and combinations thereof, wherein the lithium titanium oxide is included in an amount of about 2.0 wt % to about 6.0 wt % of the position active material, the lithium intercalation compound being greater in amount than the lithium titanium oxide.

9. The method of claim 8, wherein the titanium compound-containing liquid has a concentration of about 1.5 wt % to about 3.0 wt % of a titanium compound based on the total amount of the liquid.

10. The method of claim 8, wherein a mixing ratio of the titanium compound-containing liquid and lithium intercalation compound is a weight ratio in a range from about 0.0092:1 to about 0.073:1.

11. The method of claim 8, wherein the drying the mixture is performed at about 60° C. to about 100° C. for about 6 hours to about 24 hours.

12. The method of claim 8, wherein the heat-treating the dried product is performed at for about 3 hours to about 20 hours.

13. The method of claim 8, wherein the lithium intercalation compound is an M-doped compound.

* * * * *